United States Patent
Henderson et al.

(10) Patent No.: US 6,818,933 B2
(45) Date of Patent: Nov. 16, 2004

(54) CMOS IMAGE SENSORS

(75) Inventors: Robert Henderson, Edinburgh (GB); Purcel Matthew, Edinburgh (GB); Jonathan Ephriam David Hurwitz, Edinburgh (GB)

(73) Assignee: STMicroelectronics Ltd., Buckinghamshire (GB)

( * ) Notice: Subject to any disclaimer, the term of this patent is extended or adjusted under 35 U.S.C. 154(b) by 0 days.

(21) Appl. No.: 10/265,289

(22) Filed: Oct. 4, 2002

(65) Prior Publication Data

US 2003/0080340 A1 May 1, 2003

(30) Foreign Application Priority Data

Oct. 5, 2001 (EP) .......................................... 01308543

(51) Int. Cl.⁷ .......................................... H01L 31/062
(52) U.S. Cl. .................. 257/290; 257/184; 257/187; 257/225; 257/231; 257/291; 257/292; 257/293; 257/296; 257/298; 257/431; 257/432
(58) Field of Search ................................ 257/184, 187, 257/218, 222, 225, 226, 231, 290–298, 431–433

(56) References Cited

U.S. PATENT DOCUMENTS

| | | | |
|---|---|---|---|
| 6,021,172 A | * | 2/2000 | Fossum et al. ................ 377/60 |
| 6,111,242 A | | 8/2000 | Afghahi .................... 250/208.1 |
| 6,369,853 B1 | * | 4/2002 | Merrill et al. ............... 348/302 |

FOREIGN PATENT DOCUMENTS

| | | | |
|---|---|---|---|
| EP | 0898419 | 2/1999 | ............ H04N/3/15 |
| EP | 0905788 | 3/1999 | ......... H01L/27/146 |
| EP | 1026880 | 8/2000 | ............ H04N/3/15 |

\* cited by examiner

*Primary Examiner*—Wai-Sing Louie
(74) *Attorney, Agent, or Firm*—Allen, Dyer, Doppelt, Milbrath & Gilchrist, P.A.; Lisa K. Jorgenson

(57) ABSTRACT

An active pixel array has the signal output of each pixel connected to a first column conductor, and a reset switch connected to a second column conductor. The first and second column conductors are connected to a read-reset amplifier. The read-reset amplifier operates in a first mode in which a reset voltage is applied to the second column line, and in a second mode in which pixel output signals are buffered from the first column line. The read-reset amplifier can also operate as a comparator forming part of an ADC circuit.

16 Claims, 7 Drawing Sheets

CMOS IMAGE SENSORS

FIELD OF THE INVENTION

The present invention relates to solid state image sensors using CMOS technology.

BACKGROUND OF THE INVENTION

Solid state image sensors using CMOS technology may suffer from fixed pattern noise because of variations in characteristics between pixels. Fixed pattern noise has been reduced by using a correlated double sampling (CDS). This requires that each pixel be read twice, as discussed in more detail below. This technique is satisfactory for many purposes, but increases circuit size and complexity and leads to additional noise.

Referring to FIG. 1, the conventional mode of operation of an active pixel array is shown. By way of example, a 3×3 array is illustrated. Each pixel 10 includes a photodiode 12, and a transistor pair 14. The transistor pair 14 forms the upper half of an NMOS source follower structure, and the lower half of the NMOS source follower structure is formed by a transistor Mx in the column line 16.

The source follower structure buffers the photodiode voltage onto the column line 16, which has a capacitance. The output voltage is then processed by a correlated double sampling in the column sampling and readout circuitry 18. This requires that the pixel be read twice. First, the light-induced signal voltage is read. Then, the pixel is reset and the pixel reset voltage is read. The signal output by the column sampling and readout circuitry 18 is the difference between these voltages. The pixels receive power and reset voltage from a regulated power supply via lines VRT arranged in the same direction as the rows.

This prior art arrangement requires two sampling steps, and uses two capacitors to hold the samples in each column. The subtraction of Vrst from Vsig removes low frequency pixel noise and thus reduces fixed pattern noise, but increases high frequency noise. The need for two capacitors increases the column area and contributes thermal (kT/C) noise.

SUMMARY OF THE INVENTION

The present invention provides a solid state image sensor comprising an array of pixels arranged in rows and columns on a semiconductor substrate for defining an image plane. The pixels of each column are connected to a respective first column conductor. Each pixel includes a photodiode, a capacitance for integrating light-induced current through the photodiode, a reset switch and a switching element for connecting the voltage on the capacitance to the respective first column conductor.

Each column has a second column conductor connected to the pixel reset switches. The first and second column conductors of each column are connected to a respective read-reset circuit that operates in a first reset mode in which a predetermined reset voltage is applied to the second column conductor, and operates in a second read mode in which pixel signal voltages are read from the first column conductor.

BRIEF DESCRIPTION OF THE DRAWINGS

An embodiment of the invention will now be described, by way of example, with reference to the drawings, in which.

DETAILED DESCRIPTION OF THE PREFERRED EMBODIMENTS

Figure 1:
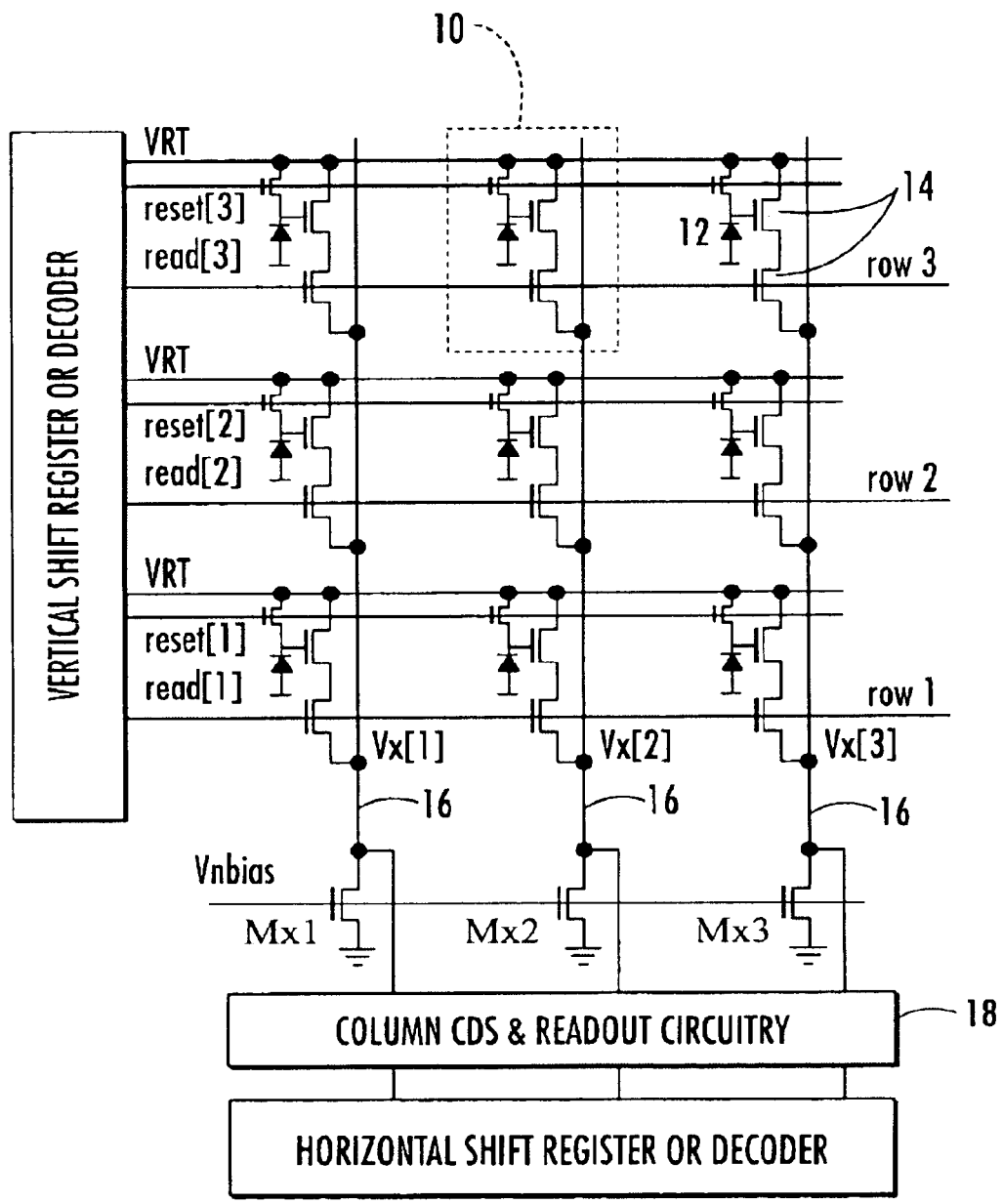
FIG. 1 is a schematic diagram of an image sensor according to the prior art.
Figure 2:
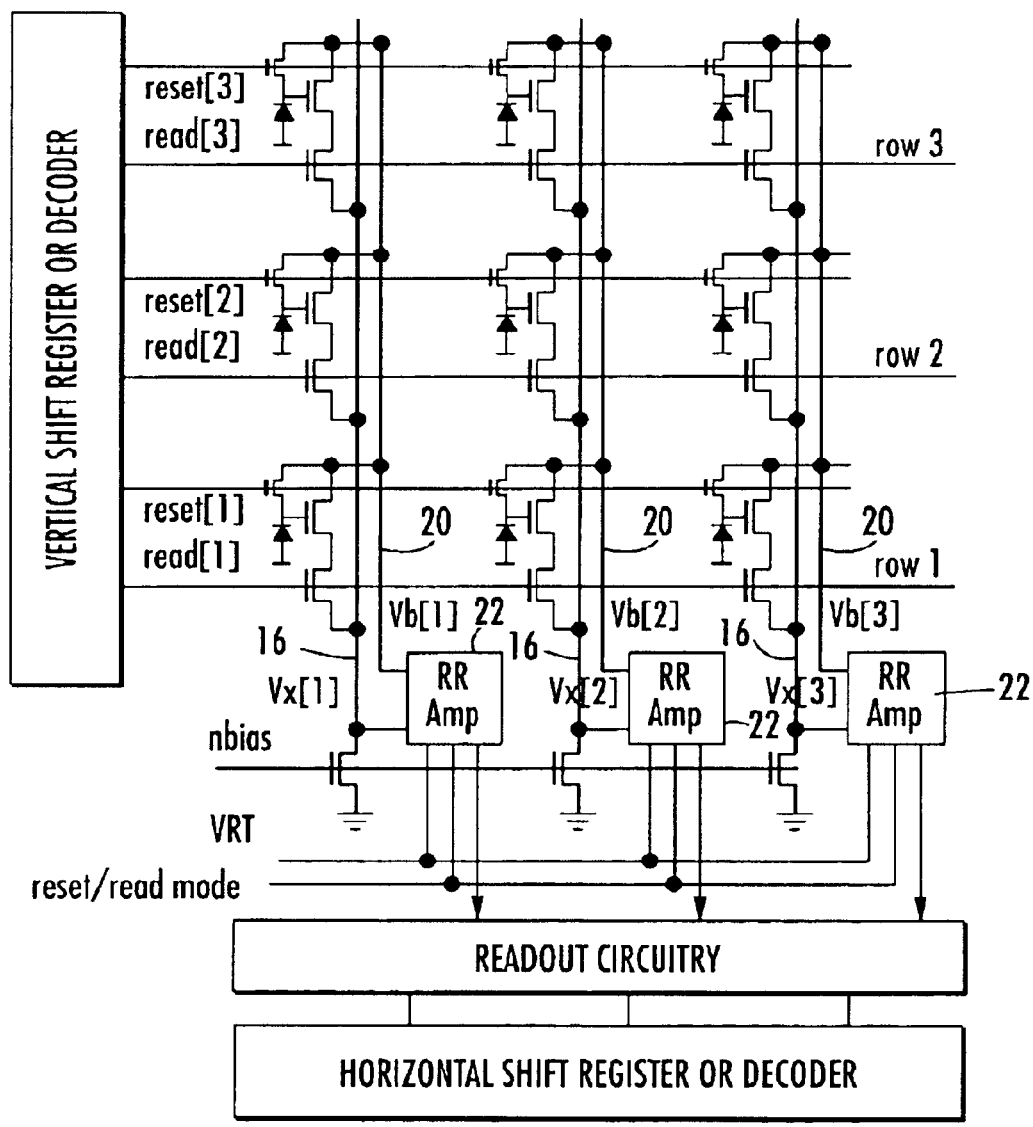
FIG. 2 is a schematic diagram of an image sensor according to the present invention.

FIG. 2 shows one example of the present invention. The elements of FIG. 2, which are similar to the elements of FIG. 1, are denoted by like reference numerals. In FIG. 2, the VRT lines illustrated in FIG. 1 are not used. Instead, each column contains a first column line 16 and a second column line 20. To minimize the capacitance of these two column lines, they are best routed in layers of metal with the Vx metal (line 16) above the VRT metal (line 20).

The two column lines 16 and 20 are connected to a read-reset amplifier (RR Amp) circuit 22 which, as will be described, takes the voltages on these two column lines and produces an output voltage to be processed by typical CMOS image sensor readout circuitry. Fixed pattern noise can be removed without a CDS operation. The readout circuitry can include such elements as buffer amplifiers, comparators, ADC elements, and memory elements.

Figure 3:
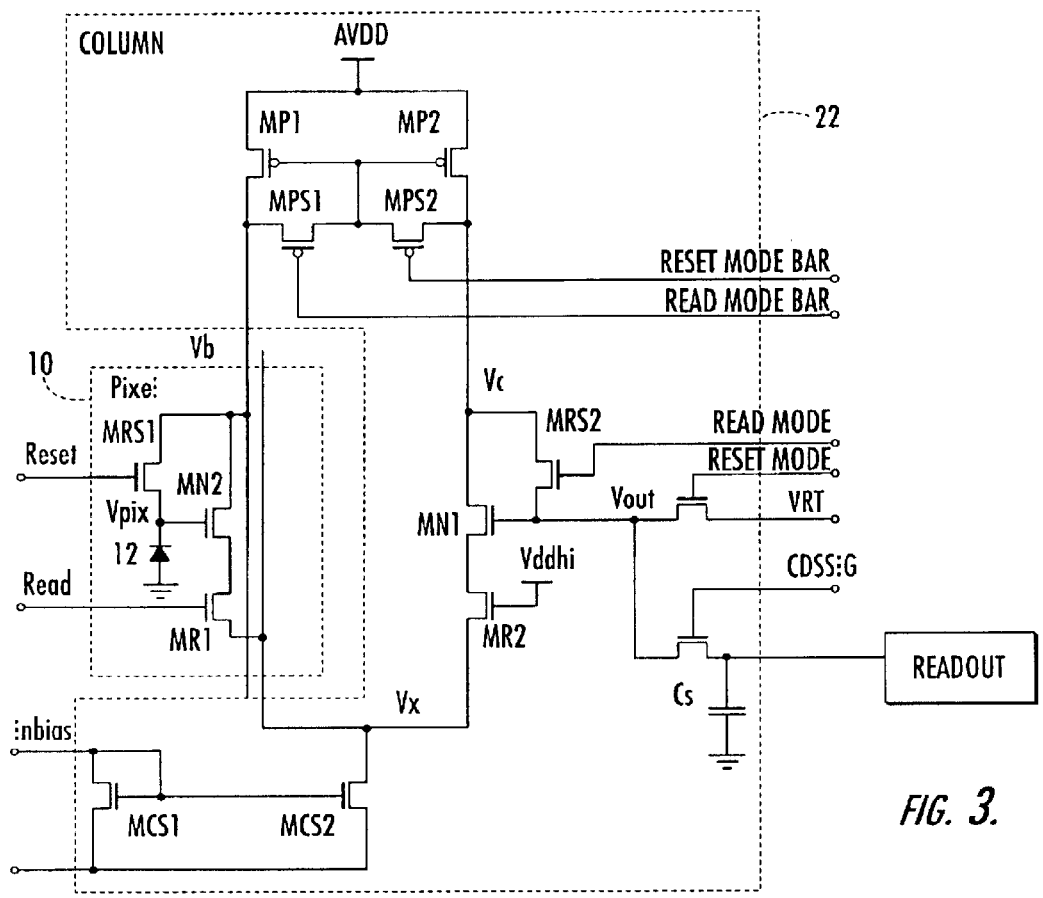
FIG. 3 is a detailed schematic of the read-reset amplifier illustrated in FIG. 2.
Figure 4:
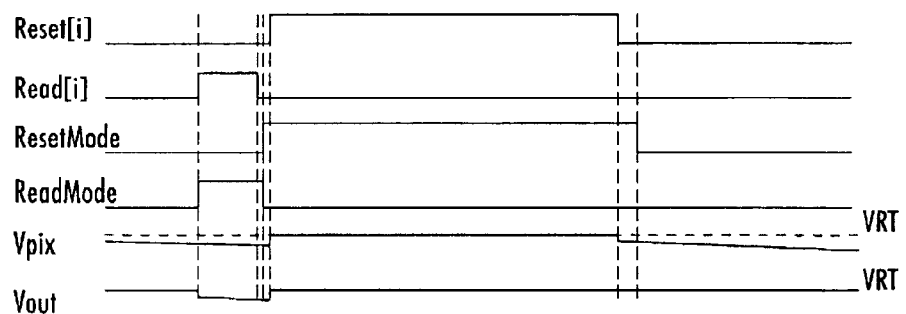
FIG. 4 is a timing diagram for the read-reset amplifier illustrated in FIG. 2.

FIG. 3 shows the schematic of the RR Amp circuit 22. One such circuit is contained at the base of each column and serves a column of pixels 10, one of which is illustrated in FIG. 3.

The RR Amp circuit 22 is essentially a single stage amplifier which uses transistors MR1 and MN2 in the pixel as one half of a differential pair, and the column current source MCS1 and MCS2 as the long tail pair bias current. Transistors MP1 and MP2 form a current source load which can be configured by transistors MPS1 and MPS2. When ReadModeBar=0 and ResetModeBar=1, the output node of the amplifier is Vc. When ResetModeBar=0 and ReadModeBar=1, the output node of the amplifier is Vb. Thus, transistors MPS1 and MPS2 create an amplifier whose direction can be changed.

Other transistors MR1, MRS1 are respectively used to read and reset the pixel. MR2 is present to match MR1 but the gate is always held at VDDHI. MRS2 is used in a reset mode to configure the amplifier as a unity gain buffer. Thus, the RR Amp 22 reuses current which is available in the column of a CMOS image sensor to make an active readout and reset amplifier. The RR Amp 22 has two modes of operation set by the control lines: ReadMode/ReadModeBar and ResetMode/ResetModeBar.

When the pixel 10 is to be reset, then the control lines are set so that ResetMode=1, ReadMode=0, ReadModeBar=1 and ResetModeBar=0. This configures the amplifier as a unity gain buffer with output Vpix and input Vout=VRT. While ResetMode=1, the pixel is reset by pulsing Reset high then low.

By resetting the pixel within the feedback loop of the amplifier 22, the kT/C reset noise is reduced over the gain and bandwidth of the amplifier. In a typical three-transistor CMOS image sensor, the pixels are reset via a sampling switch that is not within the feedback loop of an amplifier. The reset switch thus causes a sampled thermal noise voltage error of sqrt(kT/C), which often sets the noise floor of the imager. The present embodiment will typically attenuate the kT/C noise injection by about 40 dB over the bandwidth of the amplifier. The RR amp 22 resets the pixel to a voltage equivalent to VRT plus the offset of the amplifier, Vpix=(VRT+Voff).

After the pixel is released from reset, the pixel integrates the light-induced photocurrent and produces a decreasing voltage. When the pixel is to be read, the control lines are set so that ReadMode=1, ResetMode=0, ResetModeBar=1 and ReadModeBar=0. This configures the amplifier as a unity gain buffer with input Vpix and output Vout. Thus, the pixel voltage is buffered to the output node Vout.

Figure 5:
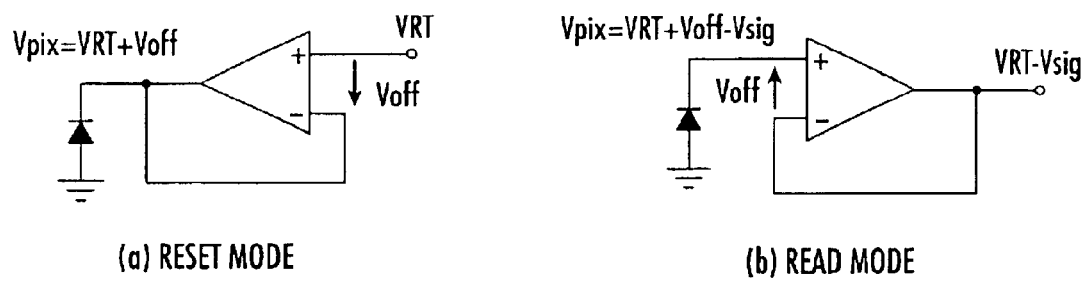
FIGS. 5a and 5b are schematic diagrams respectively illustrating operation of the read-reset amplifier in a reset mode and in a read mode.

The offset of the amplifier is now inverted with respect to the reset mode state. This causes the output Vout=Vpix−Voff, but since the pixel was originally reset to the voltage VRT+Voff, the offset contribution is cancelled. These two modes are summarized in FIG. 5.

The RR Amp 22 cancels both pixel-to-pixel offset variations due to Vt mismatches of pixel transistors, and also column offsets due to mismatches of the column amplifiers. These variations cause fixed pattern noise (FPN) and would give rise to speckling and vertical lines in the images. This technique also requires only one sampling capacitor Cs, as compared with the two capacitors required for the CDS readout, thus halving the column area and kT/C noise.

Figure 6A:
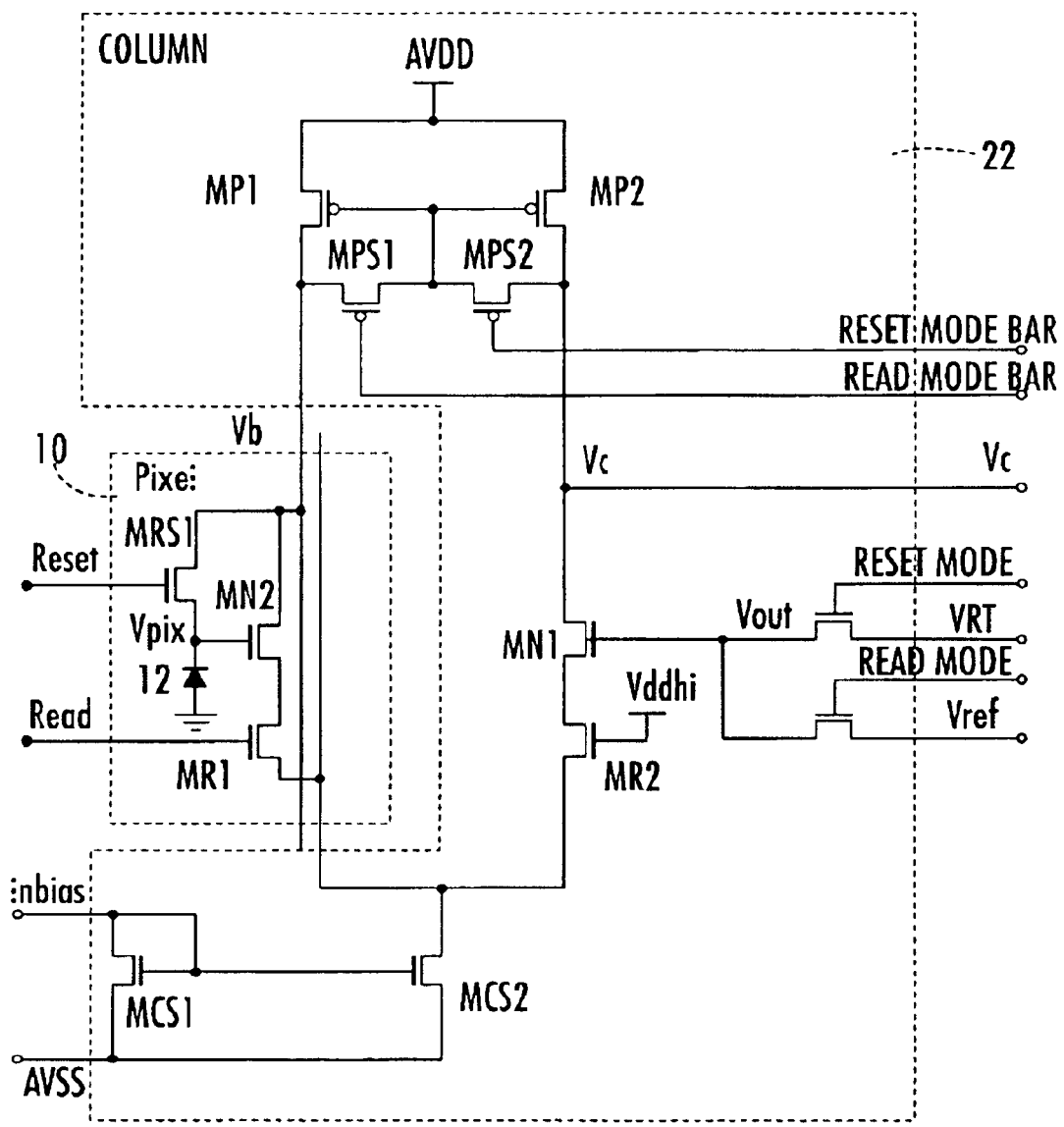
FIG. 6a is a schematic diagram of the read-reset amplifier operating as a comparator according to the present invention.

Another feature of the present embodiment is that the RR Amp 22 can be used during readout as a comparator forming part of an in-column analog-to-digital converter (ADC), as illustrated in FIG. 6a. In this mode the settings ReadMode=0, ReadModeBar=0, ResetMode=0 and ResetModeBar=1 are used to configure the RR Amp 22 as an open-loop amplifier with output node Vc, i.e., a comparator. This comparator can be used within an ADC conversion system by applying a reference voltage Vref to the Vout node. If the voltage Vref exceeds Vpix, the output node Vc will be at a low voltage, otherwise Vc=AVDD.

Figure 6B:
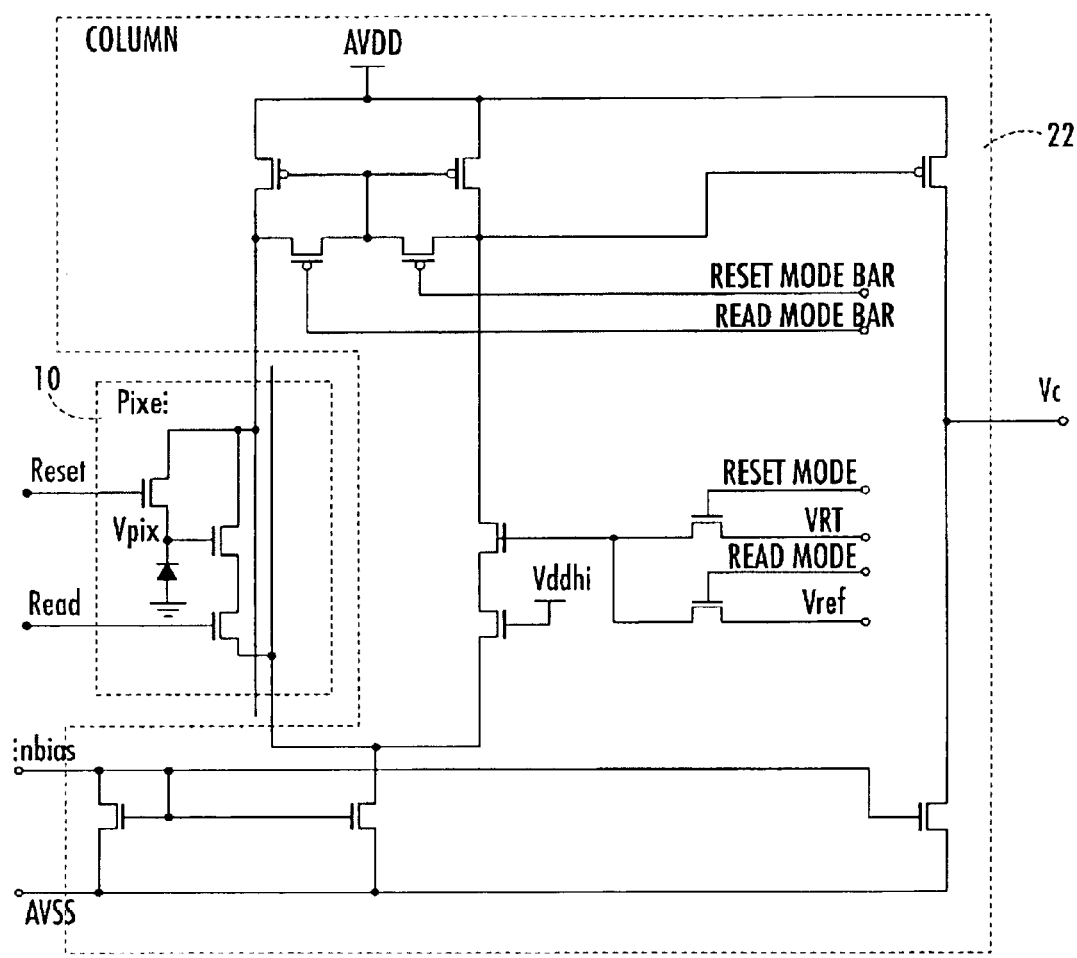
FIG. 6b is a schematic diagram of the read-reset amplifier forming a comparator with a rail-to-rail output voltage according to the present invention.

An extra stage can be added if the Vc low state is to be at logic voltage levels (FIG. 6b). Typical ADC conversion schemes can be applied, such as successive approximation or single-slope ramp techniques. One of the advantages of using the RR Amp 22 as a comparator in a readout mode is reduction of the current consumption, since the readout current is reused for ADC conversion. Also, a sampling capacitor is not required within the column, thus reducing area and kT/C noise.

Figure 7:
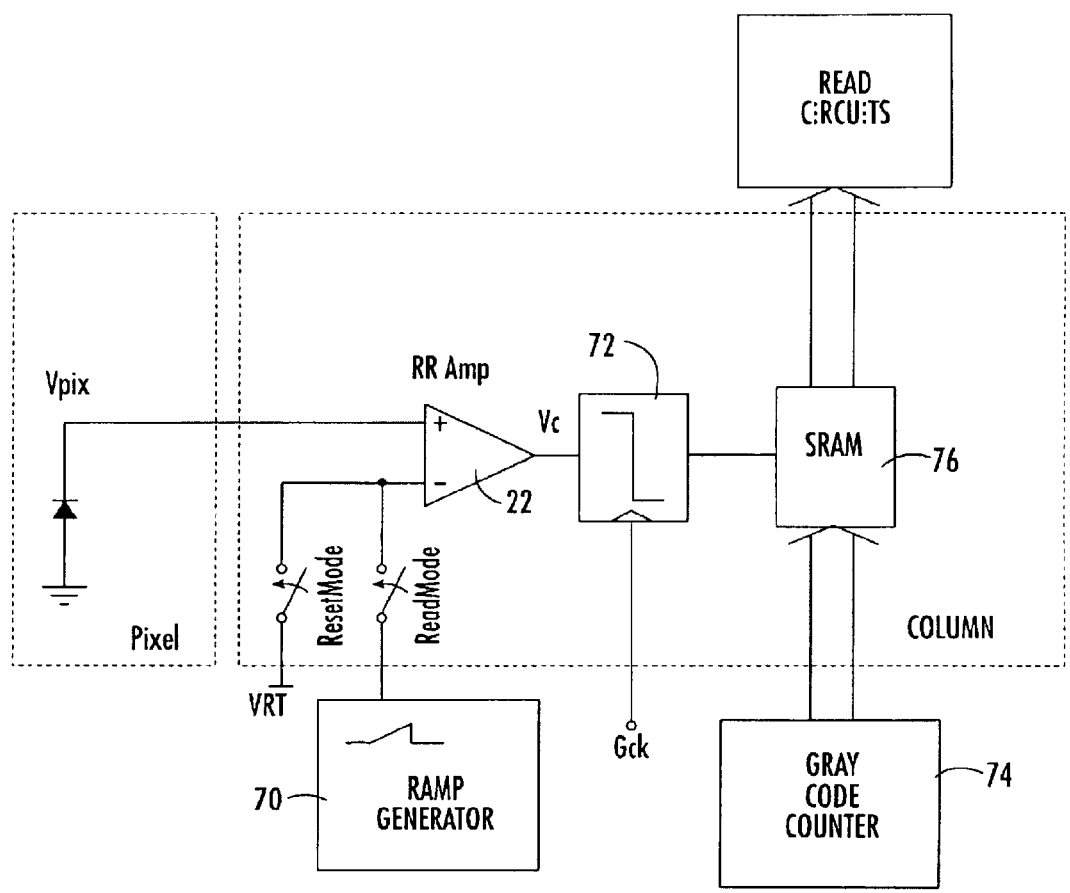
FIG. 7 is a block diagram showing a read-reset amplifier used as an amplifier within a single slope, in-column analog-to-digital converter according to the present invention.

FIG. 7 illustrates the use of a read-reset amplifier within a single slope ADC. Note that a CDS sampling capacitor is not required. A ramp generator 70 generates an upward ramp voltage at Vref, which is compared against the pixel voltage by the RR Amp 22. A latched comparator stage 72 converts the voltage Vc into a digital state on every rising clock edge of Gck. A digital counter 74 increments a Gray code value on every negative clock edge of Gck. When the latched comparator 72 changes state, the Gray code count value gcc is latched into SRAM 76. The latched counter value is then a measure of the signal on the pixel node Vpix. The contents of SRAM 76 are read out when the ADC conversion is completed.

When the RR Amp 22 is used as a comparator within an ADC, the input-referred thermal noise is very low because of the high forward gain. The input-referred noise of conventional active pixels is much higher because of the low gain of the source follower (near unity). Other noise sources such as kT/C noise from CDS sampling capacitors contribute much more noise when the input-referred noise is due to the low gain. When the RR Amp 22 is used as a comparator, kT/C sampling noise is absent since there are no capacitors. Noise contributions of a conventional in-column ADC are improved by placing a high gain close to the pixel by the RR comparator. Noise contributions of other column elements, such as amplifiers or latches, are less important due to the high gain at the pixel.

The read-reset amplifier technique is applicable to any pixel with an NMOS source follower output and a reset switch. Improvements and modifications may be incorporated without departing from the scope of the invention.

What is claimed is:

1. A solid state image sensor comprising:
   a semiconductor substrate;
   an array of pixels arranged in rows and columns, on said semiconductor substrate for defining an image plane, each pixel comprising
      a photodiode
      a capacitance for integrating light-induced current through the photodiode,
      a reset switch, and
      a switching element;
   a plurality of first and second column conductors, first column conductors connected to said switching elements of respective columns for receiving a voltage on said pixel reset switches of respective columns; and
   a plurality of read-reset circuits connected to respective first and second column conductors, and operating in a reset mode for applying reset voltages to the respective second column conductors, and operating in a read mode for reading pixel signal voltages from the respective first column conductors.

2. An image sensor according to claim 1, wherein each pixel comprises at least one transistor; and wherein each read-reset circuit operates as a single stage amplifier while using said at least one transistor in a selected pixel as one half of a differential pair.

3. An image sensor according to claim 2, wherein each read-reset circuit comprises:
   a current source load; and
   a pair of transistors connected to said current source load and being switched by an inverse of read mode signals and reset mode signals so that a configuration of said current source load alternates during the reset and read modes.

4. An image sensor according to claim 3, wherein each read-reset circuit operates in the reset and read modes as a unity gain buffer.

5. An image sensor according to claim 1, wherein each read-reset circuit has associated therewith an offset voltage that is added to the reset voltage when resetting the pixels, and is subtracted from the signal voltages when reading the pixels.

6. An image sensor according to claim 1, further comprising analog-to-digital converter circuitry connected to said plurality of read-reset circuits, and wherein each read-reset circuit functions as a comparator.

7. An image sensor according to claim 6, wherein said analog-to-digital converter circuitry comprises a single slope, in-column analog-to-digital converter circuitry.

8. An image converter according to claim 7, wherein each read-reset circuit compares a pixel signal voltage with a ramp voltage and provides an output signal based upon the comparison; and further comprising a plurality of latching comparators, each latching comparator being driven by the output signal of a respective read-reset circuit, and a change of state of said latching comparator causes an accumulated count to be output as a digital pixel signal.

9. A solid stated image sensor comprising:
   an array of pixels arranged in rows and columns for defining an image plane;
   a plurality of first and second column conductors, first column conductors connected to respective columns and second column conductors connected to respective columns; and
   a plurality of read-reset circuits connected to respective first and second column conductors, and operating in a reset mode for applying reset voltages to the respective second column conductors, and operating in a read mode for reading pixel signal voltages from the respective first column conductors.

10. An image sensor according to claim 9, wherein each pixel comprises at least one transistor; and wherein each read-reset circuit operates as a single stage amplifier while using said at least one transistor in a selected pixel as one half of a differential pair.

11. An image sensor according to claim 10, wherein each read-reset circuit comprises:
    a current source load; and
    a pair of transistors connected to said current source load and being switched by an inverse of read mode signals and reset mode signals so that a configuration of said current source load alternates during the reset and read modes.

12. An image sensor according to claim 11, wherein each read-reset circuit operates in the reset and read modes as a unity gain buffer.

13. An image sensor according to claim 9, wherein each read-reset circuit has associated therewith an offset voltage that is added to the reset voltage when resetting the pixels, and is subtracted from pixel signal voltages when reading the pixels.

14. An image sensor according to claim 9, further comprising analog-to-digital converter circuitry connected to said plurality of read-reset circuits, and wherein each read-reset circuit functions as a comparator.

15. An image sensor according to claim 14, wherein said analog-to-digital converter circuitry comprises a single slope, in-column analog-to-digital converter circuitry.

16. An image converter according to claim 15, wherein each read-reset circuit compares a pixel signal voltage with a ramp voltage and provides an output signal based upon the comparison; and further comprising a plurality of latching comparators, each latching comparator being driven by the output signal of a respective read-reset circuit, and a change of state of said latching comparator causes an accumulated count to be output as a digital pixel signal.

* * * * *

UNITED STATES PATENT AND TRADEMARK OFFICE
CERTIFICATE OF CORRECTION

PATENT NO.   : 6,818,933 B2
DATED        : November 16, 2004
INVENTOR(S)  : Robert Henderson et al.

It is certified that error appears in the above-identified patent and that said Letters Patent is hereby corrected as shown below:

Column 1,
Line 1, delete "CM OS" insert -- CMOS --

Column 3,
Line 9, delete "40 dB" insert -- 40dB --

Column 4,
Line 31, delete "said pixel" insert -- said capacitance, and second column conductors connected to said pixel --
Line 57, delete "the signal" insert -- pixel signal --

Signed and Sealed this

Twenty-fourth Day of May, 2005

JON W. DUDAS
*Director of the United States Patent and Trademark Office*